(12) United States Patent
Jordan et al.

(10) Patent No.: US 7,339,459 B2
(45) Date of Patent: *Mar. 4, 2008

(54) THEFT PREVENTION SYSTEM FOR AN AUTOMOBILE HAVING A POWER DOOR

(75) Inventors: Matthew Jordan, Ann Arbor, MI (US); Ronald Shpakoff, Northville, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 11/369,017

(22) Filed: Mar. 7, 2006

(65) Prior Publication Data

US 2006/0220804 A1 Oct. 5, 2006

Related U.S. Application Data

(63) Continuation of application No. 10/772,249, filed on Feb. 6, 2004, now Pat. No. 7,026,920.

(51) Int. Cl.
*B60R 25/00* (2006.01)

(52) U.S. Cl. ............................... 340/426.28; 340/426.1; 340/466; 307/10.2; 180/281; 180/287

(58) Field of Classification Search ............ 340/426.28, 340/426.27, 426.1; 307/10.2; 180/281, 180/287
See application file for complete search history.

(56) References Cited

U.S. PATENT DOCUMENTS

| 2,056,750 | A | 10/1936 | Vincent |
| 2,217,495 | A | 10/1940 | Preston |
| 3,722,615 | A | 3/1973 | Okada et al. |
| 4,038,635 | A | 7/1977 | Schotz |
| 4,224,920 | A | 9/1980 | Sugasawa et al. |
| 4,422,421 | A | 12/1983 | Ezoe |
| 4,494,519 | A | 1/1985 | Masuno |
| 4,561,411 | A | 12/1985 | Masuno |
| 4,939,776 | A | 7/1990 | Bender |
| 5,105,099 | A | 4/1992 | Routh et al. |
| 5,160,914 | A | 11/1992 | Sato |
| 5,172,094 | A | 12/1992 | Stadler |
| 5,648,754 | A | 7/1997 | Hwang |
| 6,323,565 | B1 | 11/2001 | Williams, Jr. et al. |
| 6,433,978 | B1 | 8/2002 | Neiger et al. |
| 7,026,920 | B2 * | 4/2006 | Jordan et al. .......... 340/426.28 |

FOREIGN PATENT DOCUMENTS

| EP | 0 580 147 A1 | 1/1994 |
| EP | 1 060 951 A2 | 12/2000 |
| KR | 2004-063590 A | 7/2004 |

* cited by examiner

*Primary Examiner*—Jeffery Hofsass
*Assistant Examiner*—Anne V. Lai
(74) *Attorney, Agent, or Firm*—Foley & Lardner LLP

(57) ABSTRACT

Various systems, methods, and computer programs are used to operate a vehicle having a power door. The power door may be opened in response to a user instruction when a vehicle speed value is below a predetermined vehicle speed value. When an alarm system for the vehicle is in an armed state, a signal representative of a synthetic vehicle speed value that is above the predetermined vehicle speed value is generated to prevent the power door from opening.

20 Claims, 2 Drawing Sheets

THEFT PREVENTION SYSTEM FOR AN AUTOMOBILE HAVING A POWER DOOR

The present application is a continuation of U.S. application Ser. No. 10/772,249, filed Feb. 6, 2004, now U.S. Pat. No. 7,026,920 the entire contents of which is incorporated herein by reference.

BACKGROUND

Typical alarm systems for automobiles (including sport utility vehicles, vans, minivans, and light trucks) can have a wide variety of features. They may include, for example, the ability to detect the opening of any of the doors, the hood, or the trunk, or the turning of the ignition key to activate the accessories or ignition. If the alarm system is armed, such an activity may result in one or several of the following: horn sounding, lights flashing, disabling of the ignition, notification to the owner via a wireless device, etc.

Some vans and minivans now include power doors. "Power door" may include a wide variety of automatically openable or otherwise motorized openings, such as power sliding doors, power back doors, sunroofs, moonroofs, convertible tops, or any other such opening. With the touch of an interior button or switch, the driver may automatically open one of these doors. In many such applications, the power door may be actuated even when the keys are not in the ignition. One switch or button may be accessible to the driver, and another may be located on or near the power door itself.

One trade-off that exists is that the button may be depressed, and, the doors opened, by others from the outside of the car, even when the doors are otherwise locked. For example, a person may be able to gain access to the car's interior by. depressing the interior power door button from outside through an open or partially opened window, even if the car's owner has armed the alarm so that it will activate (i.e., sound the horn and flash the lights) upon the power door opening.

SUMMARY OF THE INVENTION

According to one embodiment of the invention, there is provided a system for a vehicle, including a power door configured to open in response to a user power door instruction when vehicle speed is below a predetermined vehicle speed value and an alarm system. The alarm system is operable in at least a disarmed state and an armed state, wherein the alarm system causes generation of a synthetic vehicle speed value that is greater than the predetermined vehicle speed value to prevent the power door from opening when the alarm system is in the armed state.

According to another embodiment of the invention, there is provided a system for a vehicle having a power door configured to open in response to a user power door instruction when vehicle speed is below a predetermined vehicle speed value. The system includes an alarm interface configured to provide an armed state instruction and an alarm system configured to operate in at least an armed state in response to the armed state instruction. The alarm system causes generation of a synthetic vehicle speed value to prevent the power door from opening when the alarm system is in the armed state.

Other embodiments of the invention provide a method of operating a vehicle having a power door and a computer readable medium having program code that causes a vehicle having a power door to perform various functions.

DETAILED DESCRIPTION OF PREFERRED EMBODIMENTS

Figure 1:
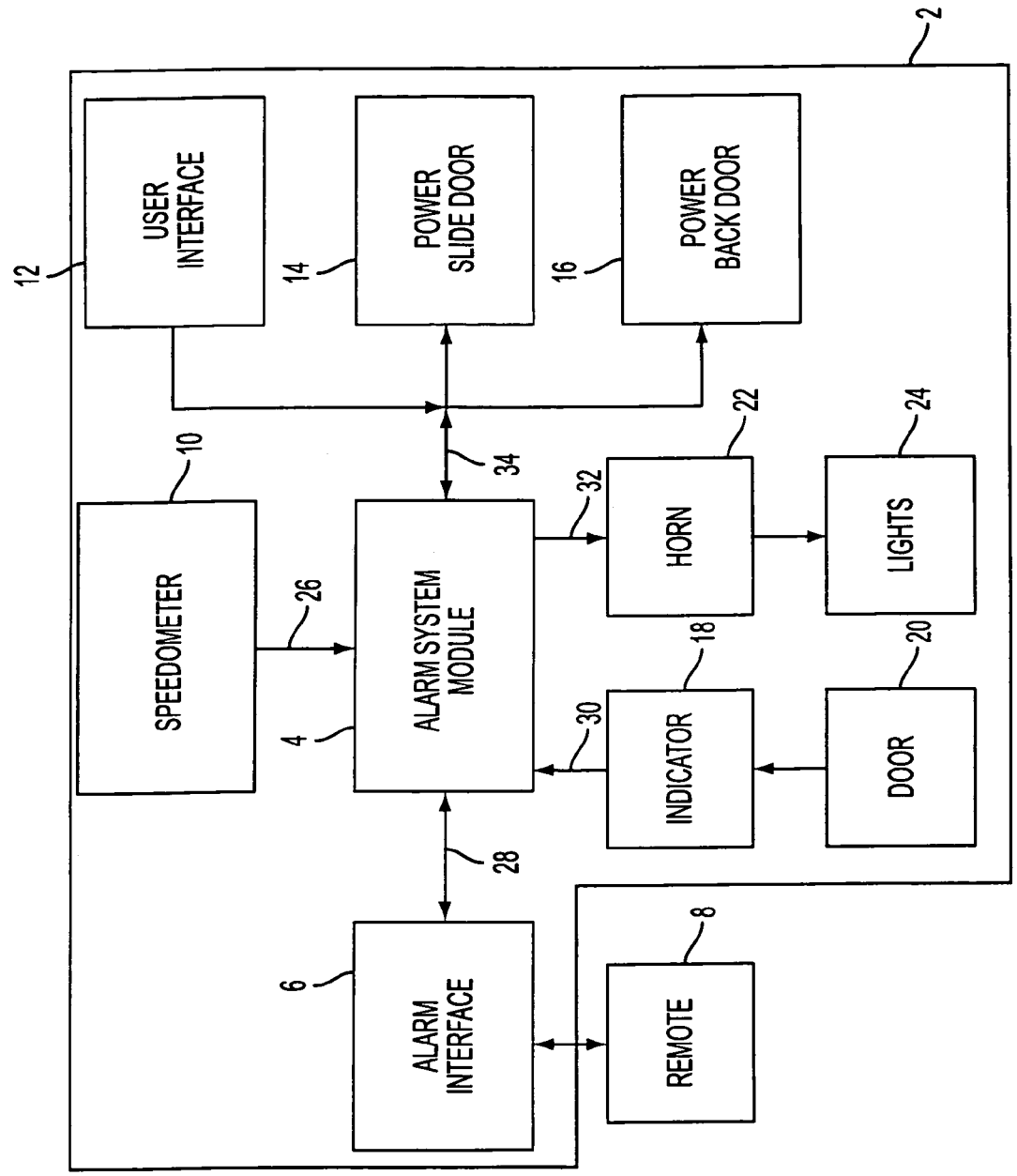
FIG. 1 shows a diagram of a theft prevention system according to a preferred embodiment.

Referring now to FIG. 1, an automobile system according to a preferred embodiment includes an automobile 2, an alarm system module 4, an alarm interface 6, a remote controller 8, a vehicle speedometer 10, a user interface 12, a power slide door 14, a power back door 16, a manually openable door 20 with indicator 18, a horn 22, and lights 24. Lights 24 may be the automobile's headlights, parking lights, interior lights, or any other lights.

The alarm system module 4 receives an actual vehicle speed value input 26, an alarm interface input 28 (which may be a state selection input, as discussed later), an indicator signal input 30, an activated state signal output 32, and a synthetic vehicle speed value output 34. The alarm system module 4 includes a logic circuit or its equivalent (such as a computer or processor running machine executable language that imitates a logic circuit, not shown).

The alarm system module 4 may perform at least the same functions as a typical alarm system module. For example, the alarm system may have several states, such as a disarmed, an armed, and an activated state. In the disarmed state, the alarm system will take no action or limited action when an inciting event occurs. An inciting event may be the opening of a door, the hood, or the trunk, or the turning of the ignition key to activate the accessories or ignition. Other inciting events are well known to those skilled in the art. In the armed state, the alarm system becomes sensitive to these inciting events. Once such an event occurs, the alarm system may change to the activated state, in which the horn may sound, the lights may flash, the ignition may be disabled, the owner may be notified via a wireless device, etc. Other possible effects resulting from activation of an alarm system are well known to those skilled in the art.

Typically, an automobile 2 will have two or more manually openable doors 20. Each door 20 has an associated indicator switch or button that turns on when the door is opened and off when the door is closed (or vice versa). The indicator 18 is connected to the alarm system module 4 via the indicator signal input 30 to provide an indicator signal signifying that the door has been opened or closed. This signal may then be subjected to the logic of the logic circuitry. In one such embodiment, if the alarm system is in an armed state and the alarm system module 4 receives an indicator signal that a door 20 has been opened, the alarm will change to an activated state and the alarm system module 4 will output an activated state signal via the activated state signal output 32. The automobile's horn 22 and lights 24 may be connected (of course, directly or indirectly) to the activated state signal output 32 so that, upon output of the activated state signal by the alarm system module 4, the horn 22 may sound and the lights 24 may flash or illuminate. The alarm system may remain in the activated state for a predetermined amount of time, such as 60 seconds, after which it may revert back to the armed state.

The alarm system module 4 is connected to an alarm interface 6 via alarm interface input 28. In one embodiment, the alarm interface 6 is a user interface, allowing a user to directly input information and instructions to the alarm system module 4 via the alarm interface 6. For example, the alarm interface 6 may include a keypad located on the automobile's exterior (such as on a door, above a handle), allowing the user to input an arming code, a disarming code, a deactivation code, or other instructions. For example, the user may be able to open the trunk by pressing the right code combination, or may be able to set the type of alarm or the length of time for the alarm, once activated, to remain in the activated state, and so forth. It will be clear to one skilled in the art that virtually any instruction to or programming of the alarm system module 4 may be performed by pressing buttons on an externally located alarm interface 6.

In a preferred embodiment, the alarm interface 6 comprises a receiver (or transceiver) that is configured to receive (and/or send) information and instructions from a remote control or keyfob 8, which may be a transmitter (or transceiver). The information-connection-between the remote 8 and the alarm interface 6 may be of any type, including but not limited to radio waves, sound waves, lasers, infrared waves, magnetic fields, or the like. The remote 8 may also be a Smart Keyless system, which allows a vehicle owner to unlock the vehicle doors using only a transponder carried by the owner. For example, using a Smart Keyless system, the owner needs only to pull the handle of a locked door and the door will unlock and open without the need for using a mechanical key or pressing "unlock" on a keyfob. Thus, mechanical keyholes are not necessary for Smart Keyless systems, but may be included for safety reasons.

The alarm interface 6 may also interface with other modules in the automobile, and need not be restricted to the alarm system module 4 or alarm-related functions. For example, the remote 8 may include a button to remotely open the trunk, remotely unlock the doors, remotely open a power door (such as power slide door 14 or power back door 16), or to remotely start the engine. These functions may be controlled by the logic in the alarm system module 4 or a different module or controller. In spite of the other modules/controllers to which the alarm interface 6 may interface, in this preferred embodiment, there is at least a one-way communication (although it could be a two-way communication) from the remote 8 to the alarm interface 6 to the alarm system module 4. The remote 8 may include buttons, switches, or other data entry devices, that correspond to particular instructions to be sent to the alarm system module 4, such as state selection instructions. For example, the remote 8 may include a "panic" button (as known in the art), and buttons to arm, disarm, or deactivate the alarm system. The remote 8, if there is a two-way communication between the alarm system module 4 and the remote 8 via the alarm interface 6, may also include an information conveying device, such as a display, a light bulb, a speaker, or a vibration mechanism, that may activate and notify the user if the alarm system has been activated. Many other features that can be accessed by the remote 8 are well known to those skilled in the art. In the simplest embodiment, the remote 8 allows the user to send state selection instructions to the alarm system module 4 via the alarm interface 6 and state selection input 28.

In one embodiment, the user interface 12 is connected to the power slide door 14 and/or the power back door 16. The user interface allows the user to provide a user power door instruction to automatically open or close at least one of the power slide door 14 and the power back door 16. The user interface 12 may be a button, switch, or other signal generating device, preferably located in the automobile's interior. The module represented by reference number 14 may include both a power slide door and a power slide door controller. For example, the power slide door may, itself, comprise only the door and the means to open/close the door, such as an electric motor and a regulator. Conversely, the power slide door controller may include a logic circuit including information inputs and a power input (that may be connected to the main automobile battery); the output of the power slide door controller may be a power signal that rotates the power door's electric motor in the proper direction to correspondingly open or close the door. For explanation purposes, these two units, the power slide door and its controller, may be treated as a single unit, the power slide door 14. The same is true for the power back door 16.

The logic within each of the power slide door 14 and power back door 16 may be such as to open or close the corresponding door only when certain conditions are met. A first condition, of course, may be the receipt of a user power door instruction from the user interface 12. A second condition may be that the alarm system is in the disarmed state. In other words, the alarm system module 4 may be configured so that the power doors 14, 16 will not automatically open (and/or close) if the alarm system is in the armed state. A third condition may be that the automobile is not moving or is moving very slowly, below a certain threshold value. This value may be between 1.0 and 4.0 km/hr, preferably around 2.5 km/hr. This feature can prevent the power door 14, 16 from being opened while the automobile is moving quickly, and thus prevent unsafe conditions, particularly for children. If the automobile is moving faster than the threshold value, providing the user power door instruction via the user interface 12 will not open the power door 14, 16.

In a preferred embodiment of the present invention, an automobile system that requires the first and third conditions (i.e., a user power door instruction is received and the car is not moving or moving slowly) may be easily and inexpensively adapted to one that also requires the second condition (i.e., the alarm system must be disarmed) as follows. An actual vehicle speed value is generated by the vehicle speedometer 10 (in ways well known in the art), and this value is fed to the alarm system module 4 via the actual vehicle speed value input 26. The alarm system module 4 may be configured to generate a synthetic vehicle speed value based at least in part on the actual vehicle speed value, with the following logic: if the alarm system is disarmed, the synthetic vehicle speed value may be set to approximately equal to the actual vehicle speed value received from the speedometer 10; if the alarm system is armed (or already activated), the synthetic vehicle speed value may be set to greater than the threshold value recognized by the power doors 14, 16. The synthetic vehicle speed value may be output to the power doors 14, 16 via a synthetic vehicle speed value output 34. The user power door instruction generated by the user interface 12 may be input directly into the alarm system module 4 (in which case reference number 34 may also refer to a user power door instruction input) or may be input directly into the power doors 14, 16.

In this embodiment, the logic circuitry of the power doors 14, 16 need not be changed or altered, because they still require the condition that the vehicle speed is below the threshold value before they may be opened by a user power door instruction from the user interface 12. However, according to the present invention, the vehicle speed value received and analyzed by the power doors 14, 16 may not be the actual vehicle speed value as generated by the vehicle speedometer 10; it may be a synthetic vehicle speed value as generated by the alarm system module 4. If the alarm system is armed or activated, the synthetic vehicle speed value may be different from the actual vehicle speed value and may be set to higher than the threshold value required by the power doors 14, 16, so that they will not open when the alarm system is armed.

In one embodiment, the alarm system module 4 may be configured so that, when the alarm system is armed, providing the user power door instruction via the user interface 12 may not be an inciting event. In other words, when the alarm system is armed, providing the user power door instruction to the power doors 14, 16 or alarm system module 4 via the user interface 12 (e.g., by pressing a button) may not open the power door(s) 14, 16, but additionally the alarm system may remain armed and will not activate.

In another embodiment, the remote 8 may include a button to provide an alarm interface power door instruction to the alarm system module 4 to open one of the power doors 14, 16. In this case, because it is assumed that a person other than the owner does not have access to the remote 8, it is preferred that the alarm system perform the function requested by the user. Thus, in a preferred embodiment, the alarm system module 4 logic circuit is configured so that if the user provides an alarm interface power door instruction (such as a power door open instruction) to the alarm system module 4 via the remote 8 and alarm interface 6, then: if the alarm system is in the disarmed state, the power door(s) 14, 16 is configured to automatically open in response to the alarm interface power door open instruction. If, however, the alarm system is in the armed or activated state, the alarm system module 4 is configured to change from the armed state to the disarmed state, and the power door(s) 14, 16 is configured to automatically open in response to the alarm interface power door open instruction.

Figure 2:
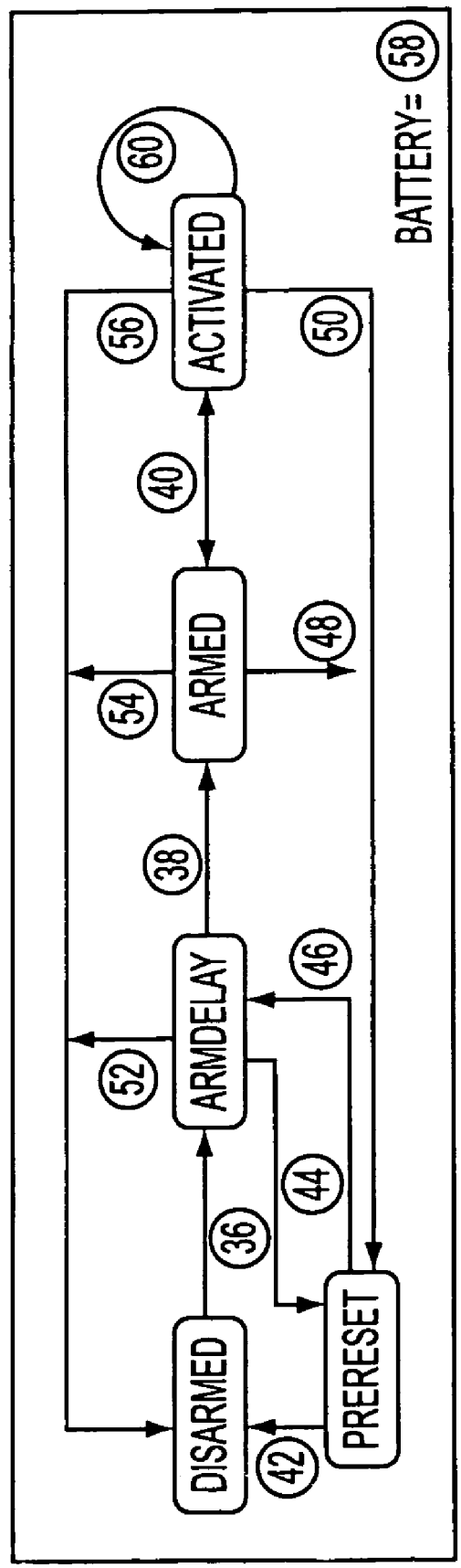
FIG. 2 shows a flowchart of one preferred implementation of the present invention.

Referring now to FIG. 2, five possible alarm states of the alarm system are shown: disarmed, arm delay, armed, activated (or anti-theft), and pre-reset. The disarmed, armed, and activated states have been discussed. The alarm system may change states from the disarmed state to the arm delay state, as shown by reference number 36, when a user presses an "arm" or "alarm on" button on the remote 8. The logic circuit of the alarm system may require, as a condition of changing to the arm delay state, that the accessories switch (the switch, usually operable by placing the key in the ignition and turning slightly, that connects the car battery to accessories, such as the radio or air conditioning fan) is turned off, the ignition switch is turned off, and the trunk and hood indicators (similar to the indicator 18 for the manually openable door 20) are turned off. Further, the alarm system may automatically change to the arm delay state when all doors are closed and the doors are locked (whether by locking with a key, a remote 8, or automatically). In other words, the alarm system may automatically change to the arm delay state when any of the following conditions is met: the door key cylinder lock switch (the switch that is usually closed when the door key is inserted into the door and turned so as to lock the door) is turned on when all indicators 18 for all manually openable doors 20 are turned off; the "lock" button is pressed on the remote 8 when all indicators 18 for all manually openable doors 20 are turned off; or the doors are automatically locked when all indicators 18 for all manually openable doors 20 are turned off. The above and following examples of events that change the state of the alarm system are examples only and are not meant to limit the scope of the present invention. Clearly, state-changing events may be chosen and programmed or pre-programmed into the alarm system module 4 logic circuit by the alarm system or car manufacturer, the user, or both.

The alarm system may then remain in the arm delay state for a predetermined period of time, such as 30 or 60 seconds, after which the system automatically changes to the armed state. In the arm delay state, if an inciting event occurs, such as the opening of a manually openable door, the alarm system may simply ignore this event, or the alarm system may change back to the disarmed state, as shown by reference number 52. A benefit to this feature is that, if a user forgets something in the car and attempts to retrieve it by opening a door after she has already pressed the "arm" button on the remote 8, the alarm system will not be armed (and, consequently, will not activate). The alarm system may change from the arm delay state to the disarmed state, e.g., when any of the following events occurs: the accessories switch or ignition switch is turned on; the door key cylinder unlock switch (the switch that is usually closed when the door key is inserted into the door and turned so as to unlock the door) is turned on; an "unlock" button is pressed on the remote 8; an "open power slide door" button is pressed on the remote 8; or any of the door indicators 18 is on (i.e., one or more of the doors 20 is opened).

Alternatively, the alarm system may change to a pre-reset state while an event, such as an inciting event, is occurring, as shown by reference number 44. For example, the alarm system may change from the arm delay state to the pre-reset state if the trunk key cylinder unlock switch (similar to the door key cylinder unlock switch) is turned on, if either of the trunk or hood indicators (similar to the door indicators 18) is turned on, or if an "open trunk" button is pressed on the remote 8 or other interface (such as an interior "open trunk" button). For example, if, during the arm delay state, the user opens the trunk, the system may change to the pre-reset state either for a predetermined period of time or until the trunk is again closed. After the event has ended (such as when both the trunk and hood indicators are turned off, indicating that they are both closed), the alarm system may change back to the arm delay state, as shown by reference number 46, at which point the arm delay state may start over or resume from where it left off (before entering the pre-reset state). Alternatively, if different events occur during the pre-reset state, such as in the following list, the alarm system may change to the disarmed state, as shown by reference number 42: either of the accessories or ignition switches are turned on; the door key cylinder unlock switch or a central door unlock switch (which may be automatic or may-be activated by an interior button) is turned on; the "unlock" button is pressed on the remote 8; or any of the door indicators 18 is turned on.

After the predetermined time has passed in the arm delay state, the alarm system may change to the armed state, as shown by reference number 38. The alarm system changing from the arm delay state to the armed state may require that none of the following signals are received by the alarm system module 4: either the accessories or ignition switch are turned on; the door key cylinder unlock switch or central door lock switch is turned on; the "unlock" button is pressed on the remote 8 (or, similarly, the Smart Keyless unlock command or other similar command is turned on); any of the door indicators 18 is turned on; or any of the trunk key cylinder switch or trunk or hood indicators is turned on.

In the armed state, the alarm system may change to any of the disarmed, activated, and pre-reset states, as shown by reference numbers 54, 40, and 48, respectively, depending on the logic in the alarm system module 4, which may depend on programming or inputs by the manufacturer or user. For example, the alarm system may change to the activated state, as shown by reference number 40, when, for example, one or more of the manually openable doors 20 is opened, as indicated by indicator(s) 18. Further, the hood and/or trunk of the car may also have corresponding indicators, such that the alarm system will change to the activated state when at least one of these are opened. Further, because a person may attempt to disconnect and reconnect the car battery in hopes that this will disable the alarm system, the alarm system may be configured to change to the activated state when the battery 58 is disconnected or reconnected. Alternatively, the alarm system may be configured to automatically enter the activated state, no matter what its previous state, when the battery 58 is disconnected or reconnected. Other possible inciting events (i.e., those events that activate the armed alarm system) will be known to one skilled in the art, and can easily be pre-programmed into the alarm system module 4 logic circuit, or programmed based on user instructions (which may be entered via the alarm interface 6). Once in the activated state, the alarm system may be configured to remain in the activated state for a predetermined period of time, such as 30 or 60 seconds. Further, as shown by reference number 60, the alarm system may "change back" to the activated state (i.e., to restart the activated state for the predetermined period of time) if any of the above mentioned inciting events occurs again.

In the armed state, the alarm system may change to the disarmed state, as shown by reference number 54, e.g., if one or-more of the following events occurs: the accessories switch is turned on; the ignition switch is turned on, the door key cylinder unlock switch is turned on; an "unlock" button is pressed on the remote 8; or an "open power slide door" button is pressed on the remote 8. As discussed, other such events are known to those skilled in the art and may be programmed into the logic circuit of the alarm system module 4 accordingly. The alarm system may change to the pre-reset state, as shown by reference number 48, for different events, such as when the trunk key cylinder unlock switch (similar to the door key cylinder unlock switch) is turned on, or when an "open trunk" or "open power back door" button is pressed on the remote 8.

In the activated state, as discussed, one or more anti-theft features may be activated (e.g., horn sounding, lights flashing, notification to the user, etc.). After a predetermined period of time, the alarm system may revert back to the armed state, as shown by reference number 40. Alternatively, the alarm system may remain in the activated state, as discussed and as shown by reference number 60, may change to the disarmed state, as shown by reference number 56, or may change to the pre-reset state, as shown by reference number 50. These changes may be caused by any of the previously mentioned events, according to the preferences of the manufacturer or user or both.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. A system for a vehicle, comprising:
  a power door configured to open in response to a user power door instruction when vehicle speed is below a predetermined vehicle speed value; and
  an alarm system operable in at least a disarmed state and an armed state, wherein the alarm system causes generation of a synthetic vehicle speed value that is greater than the predetermined vehicle speed value to prevent the power door from opening when the alarm system is in the armed state.

2. The system as in claim 1, wherein the alarm system is further operable in an activated state, wherein when the alarm system is in the activated state the alarm system causes generation of the synthetic vehicle speed value to prevent the power door from opening.

3. The system as in claim 1, wherein the power door is a power slide door.

4. The system as in claim 1, wherein the power door is a power back door.

5. The system as in claim 1, further comprising a user interface located in an interior portion of the vehicle to provide the user power door instruction.

6. The system as in claim 5, further comprising an alarm interface to provide a state selection instruction to operate the alarm system in the armed state or the disarmed state.

7. The system as in claim 6, wherein the alarm interface is further configured to provide an alarm interface power door instruction, the power door configured to open in response to the alarm interface power door instruction from the alarm interface when vehicle speed is below the predetermined vehicle speed value.

8. The system as in claim 7, wherein when the alarm system is in the armed state the alarm system is changed to the disarmed state in response to the alarm interface power door instruction.

9. A system for a vehicle having a power door configured to open in response to a user power door instruction when vehicle speed is below a predetermined vehicle speed value, the system comprising:
  an alarm interface configured to provide an armed state instruction; and
  an alarm system configured to operate in at least an armed state in response to the armed state instruction,
  wherein the alarm system causes generation of a synthetic vehicle speed value to prevent a power door from opening when the alarm system is in the armed state.

10. The system as in claim 9, wherein the alarm system is further configured to operate in an activated state, wherein when the alarm system is in the activated state the alarm system causes generation of the synthetic vehicle speed value to prevent the power door from opening.

11. The system as in claim 9, wherein the alarm interface is further configured to provide an alarm interface power door instruction, and wherein when the alarm system is in the armed state the alarm system is changed to the disarmed state in response to the alarm interface power door instruction.

12. A method of operating a vehicle having a power door, comprising:
  opening a power door in response to a user instruction when a vehicle speed value is below a predetermined vehicle speed value; and
  generating a synthetic vehicle speed value that is above the predetermined vehicle speed value when an alarm system for a vehicle is in an armed state to prevent the power door from opening.

13. The method of claim 12, wherein the alarm system is further operable in an activated state, wherein the method comprises, when the alarm system is in the activated state, causing generation of the synthetic vehicle speed value to prevent the power door from opening.

14. The method of claim 12, wherein the power door is a power slide door.

15. The method of claim 12, wherein the power door is a power back door.

16. A computer readable medium having program code that, when executed on a computing system, causes a vehicle having a power door to perform the following functions:

opening a power door in response to a user instruction when a vehicle speed value is below a predetermined vehicle speed value; and generating a signal representative of a synthetic vehicle speed value that is above the predetermined vehicle speed value when an alarm system for a vehicle is in an armed state to prevent the power door from opening.

17. The medium of claim 16 wherein the medium has program code that, when executed on the computing system, causes the alarm system to be operable in an activated state, such that when the alarm system is in the activated state the alarm system causes generation of the synthetic vehicle speed value to prevent the power door from opening.

18. The medium of claim 16 wherein the power door is a power slide door.

19. The medium of claim 16 wherein the power door is a power back door.

20. The medium of claim 16 wherein the medium has program code that, when executed on the computing system, causes the alarm system to be operable in an arm delay state.

* * * * *